| (12) | United States Patent | (10) Patent No.: | US 9,820,331 B1 |
|---|---|---|---|
| | Singh et al. | (45) Date of Patent: | Nov. 14, 2017 |

(54) UE-CONTEXT RELEASE IN RESPONSE TO FAILURE OF AIR INTERFACE COMMUNICATION

(71) Applicant: Sprint Spectrum L.P., Overland Park, KS (US)

(72) Inventors: Jasinder P. Singh, Olathe, KS (US); Siddharth S. Oroskar, Overland Park, KS (US); Anoop K. Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 190 days.

(21) Appl. No.: 14/619,346

(22) Filed: Feb. 11, 2015

(51) Int. Cl.
*H04W 76/06* (2009.01)
*H04W 28/04* (2009.01)

(52) U.S. Cl.
CPC ......... *H04W 76/064* (2013.01); *H04W 28/04* (2013.01)

(58) Field of Classification Search
None
See application file for complete search history.

(56) References Cited

U.S. PATENT DOCUMENTS

| 9,019,987 | B1 * | 4/2015 | Marupaduga | H04W 88/06 370/465 |
| 2011/0075675 | A1 * | 3/2011 | Koodli | H04L 12/14 370/401 |
| 2012/0140695 | A1 * | 6/2012 | Hunzinger | H04L 1/1812 370/315 |
| 2012/0214492 | A1 * | 8/2012 | Mihaly | H04W 76/041 455/437 |
| 2013/0114446 | A1 * | 5/2013 | Liu | H04W 24/10 370/252 |
| 2014/0119172 | A1 * | 5/2014 | Liu | H04L 43/0811 370/218 |

(Continued)

FOREIGN PATENT DOCUMENTS

WO 2014089069 6/2014

OTHER PUBLICATIONS

3rd Generation Partnership Project; Technical Specification Group Radio Access Network; Evolved Universal Terrestrial Radio Access Network (E-UTRAN); S1 Application Protocol (SLAP) (Release 8); p. 28 (2008).*

(Continued)

*Primary Examiner* — Andrew Oh

(57) ABSTRACT

Disclosed is a method and system for release of a UE's context record in response to failure of air interface communication. As disclosed, a wireless communication system includes a base station that has a protocol stack defining a series of logical processing layers through which the base station sequentially processes data for transmission to a UE. The layers include an upper layer and a physical layer at which the base station processes the data for communication over an air interface to the UE. Accordingly, the base station detects failure of air interface communication between the base station and the UE. In response to detecting the failure, and without waiting to detect at the upper layer a further failure corresponding with the failure of the air interface communication, the base station transmits to a network controller a UE-context release request requesting release of bearer context that was established for the UE.

20 Claims, 7 Drawing Sheets

(56) References Cited

U.S. PATENT DOCUMENTS

| | | | |
|---|---|---|---|
| 2014/0179318 A1 | 6/2014 | Wang | |
| 2014/0204771 A1* | 7/2014 | Gao | H04W 36/28 370/252 |
| 2014/0206353 A1* | 7/2014 | Kim | H04W 36/14 455/436 |
| 2014/0248882 A1* | 9/2014 | Wang | H04W 24/04 455/436 |
| 2014/0287726 A1* | 9/2014 | Jang | H04W 36/0083 455/411 |
| 2014/0321267 A1* | 10/2014 | Jiang | H04L 45/28 370/225 |
| 2014/0349659 A1* | 11/2014 | Ishii | H04W 8/082 455/444 |
| 2015/0133081 A1* | 5/2015 | Griot | H04L 12/1435 455/407 |
| 2015/0223093 A1* | 8/2015 | Zhang | H04W 24/10 370/252 |
| 2015/0245402 A1* | 8/2015 | Mochizuki | H04W 36/22 370/331 |
| 2015/0296444 A1* | 10/2015 | Sfar | H04W 48/16 455/434 |
| 2016/0050653 A1* | 2/2016 | Rastogi | H04W 72/0406 455/453 |
| 2016/0143003 A1* | 5/2016 | Yi | H04L 1/08 370/329 |
| 2016/0183103 A1* | 6/2016 | Saily | H04W 36/02 370/216 |
| 2016/0192269 A1* | 6/2016 | Kim | H04W 36/30 370/332 |
| 2016/0212706 A1* | 7/2016 | Kahtava | H04W 52/0229 |
| 2016/0227434 A1* | 8/2016 | Grinshpun | H04W 28/0289 |
| 2016/0285679 A1* | 9/2016 | Dudda | H04W 24/02 |
| 2016/0286470 A1* | 9/2016 | Lee | H04W 48/16 |

OTHER PUBLICATIONS

3rd Generation Partnership Project; Technical Specification Radio Access Network; Evolved Universal Terrestrial Radio Access Network; S1 application protocol. 36.413 v8.4.0. Dec. 2008.*

3rd Generation Partnership Project; Technical Specification Group Radio Access Network; Evolved Universal Terrestrial Radio Access Network (E-UTRAN); S1 Application Protocol (S1AP) (Release 8); p. 28 (2008).

* cited by examiner

UE-CONTEXT RELEASE IN RESPONSE TO FAILURE OF AIR INTERFACE COMMUNICATION

BACKGROUND

Unless otherwise indicated herein, the description provided in this section is not itself prior art to the claims and is not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In particular, each coverage area may operate on one or more carriers each defining a respective frequency bandwidth of coverage. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs.

Further, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1×RTT and 1×EV-DO), Wireless Interoperability for Microwave Access (WiMAX), and Global System for Mobile Communications (GSM), among others. Each protocol may define its own procedures for registration of UEs, initiation of communications, handover between coverage areas, and other functions related to air interface communication.

In accordance with the LTE protocol, for instance, when a UE enters into coverage of a base station, the UE may engage in attach signaling with the base station, by which the UE would register to be served by the base station on a particular carrier. Through the attach process and/or subsequently, the base station and supporting network infrastructure may establish for the UE one or more bearers, essentially defining logical tunnels for carrying bearer data between the UE and a transport network such as the Internet. Once attached with the base station, a UE may then operate in a "connected" mode in which the base station may schedule data communication to and from the UE on the UE's established bearer(s).

Moreover, a network may include a plurality of network controllers that function to facilitate setup and management of bearers through which UEs can engage in data communication, to facilitate tracking and status of UEs throughout the network, and to facilitate paging of UEs for incoming communications. In an LTE network, such controllers can be referred to as mobility management entities (MMEs). Each MME may serve one or more portions of the network known as tracking areas, each of which may include a number of base stations known as eNodeBs arranged to provide coverage for UEs. Thus, an MME may serve the UEs that are operating within coverage of an eNodeB in a tracking area served by the MME.

When a network controller serves a UE, the network controller may store a context record for the UE. The context record may include information that helps the network controller serve the UE, such as data specifying a subscription profile for the UE, data specifying capabilities of the UE, and/or data specifying service status of the UE such as particular bearers or other connections that are established for the UE, among others. The network controller may then make use of that context record while serving the UE. For example, if the UE seeks to engage in a particular type of communication, the network controller may refer to the UE's context record to determine if that type of communication is authorized by the UE's subscription profile and may allow the communication if the particular type of communication is authorized. In another example, as the UE transitions between an active or "connected" mode in which the UE has an assigned radio link and an "idle" mode in which the UE does not have an assigned radio link, the network controller may receive signaling indicative of that transition and may update the UE's context record to indicate whether the UE is currently operating in the connected mode or in the idle mode. Other examples may also be possible.

Further, an air interface protocol may include a user plane protocol stack and a control plane protocol stack to organize data carried between a respective base station and UEs. In accordance with LTE, for instance, the user plane protocol stack may be responsible for user data transmission and may include a Packet Data Convergence Protocol (PDCP) layer, a Radio Link Control (RLC) layer, and a Medium Access Control (MAC) layer. Additionally, the control plane protocol stack may be responsible for control signal transmission and may also include a PDCP layer, a RLC layer, and a MAC layer, as well as a Radio Resource Control (RRC) layer.

The various layers may have different roles in organizing the data as the data is communicated between layers in the protocol stacks using logical channels and transport channels. For example, an Internet protocol (IP) packet header may contain nonessential control information that increases the size of the header and thus increases the difficulty to efficiently transmit IP packets over a radio link having a relatively small bandwidth. Thus, the PDCP layer may perform a header compression operation for the purpose of reducing size of the IP header before transmission of the data at a physical (PHY) layer. As such, the base station may sequentially process data through one or more upper layers down to the physical layer at which the base station processes the data for communication over an air interface to a UE.

Overview

Successful physical layer transmission of data from a base station to a UE results in the UE receiving the data and performing subsequent operations in response to receipt of the data. Whereas, failure of physical layer transmission of data from the base station to the UE (also known as a radio-link layer failure) results in the UE failing to receive the data and thus failing to perform the subsequent operations. In practice, the base station can detect successful physical layer transmission of data from the base station to the UE by receiving an acknowledgement, from the UE, representing successful transmission of the data.

A failure to receive such acknowledgement, however, may result in detection, by the base station, of a physical layer failure of air interface communication between the base station and the UE. For instance, the base station may detect such failure at the physical layer upon detecting a threshold number of data transmission attempts at which the base station fails to receive the acknowledgement from the UE. Alternatively, the base station may detect threshold duration, since transmission of the data, of the base station failing to receive the acknowledgment from the UE. Other examples may also be possible.

Generally, receiving by the base station the acknowledgment from the UE may cause a subsequent series of acknowledgements to pass up the layers of the protocol stack. For instance, the physical layer may send an acknowledgement to the MAC layer and then the MAC layer may responsively send an acknowledgement to the RLC layer and so on. These acknowledgments may also represent successful transmission of the data from the base station to the UE. As such, receiving an acknowledgement by a particular layer, from a lower layer, may enable the particular layer to transmit subsequent data.

On the other hand, detecting failure of air interface communication by the base station may cause the base station to trigger re-transmissions of the data at the upper layers such as at the MAC layer, at the RLC layer and/or at the PDCP layer for example. For instance, detection of physical layer failure of air interface communication may result in attempts to re-transmit the data at the MAC layer. A MAC layer failure may then result in attempts to re-transmit the data at the RLC layer, and a subsequent RLC layer failure may result in attempts to re-transmit the data at the PDCP layer and so on.

The base station may detect a failure at an upper layer in one of various ways. For example, the base station may detect threshold duration, since transmission of data from a particular layer to a lower layer, of the particular layer failing to receive an acknowledgment from the lower layer. In a specific example, the base station may detect a threshold delay, resulting from failure to receive the acknowledgement, of outputting data from the PDCP layer for further processing by the protocol stack. Other examples may also be possible.

Generally, detection of failure at an upper layer, such as the PDCP layer, may cause the base station to send a UE-context release request to a network controller (e.g., an MME). Once the network controller receives the UE-context release request, the network controller may operate to trigger release of the initial bearer connection established for the UE, thereby ceasing further communication of bearer data, over this bearer connection, between the UE and various remote entities. Additionally, the network controller may also operate to release (e.g., delete) the context record that had identified the bearer connection and facilitated exchange of bearer traffic for the UE. This release process may result in implicitly detaching the UE from the network, by clearing the resources in the network that had been allocated to serve the UE.

Further, the UE can also detect the physical layer failure of air interface communication and may do so in one of various ways. For instance, the UE may detect the failure by determining a lack of response, from the base station, to a communication from the UE to the base station. In some cases, after detecting by the UE the failure of air interface communication, the UE may attempt to establish a new network connection with the wireless communication system via a different base station. During the process of the UE establishing the new network connection via the different base station, the different base station may send to the network controller a service request requesting to establish for the UE one or more new bearers.

However, the network controller may deny the service request if the network controller still has stored thereon a context record, for the UE, identifying the initial bearer connection that was established for the UE via the original base station. The network controller may still have the context record at that time because, as noted above, a base station generally waits for failure at an upper layer before taking steps to request release of the context record that was established for the UE. Given this arrangement, if the network controller receives the service request before release of the UE's context record, the network controller may deny the service request because the network controller may interpret the existing context record as the UE still receiving service via the initial bearer connection. In this event, the UE may perceive denial of the service request as an access failure and may again seek to establish a new network connection. This may result in unnecessary consumption of network resources and a delay in establishing a new network connection for the UE, among other undesirable outcomes.

Disclosed herein is an arrangement to help overcome problems resulting from the wait to detect failure at the PDCP layer before requesting release of a UE's context record. In accordance with the disclosure, a base station may detect a physical layer failure of air interface communication between the base station and the UE, and may responsively transmit a UE-context release request to a network controller. The base station may do so without waiting for upper layer (e.g., PDCP layer) failure corresponding with the physical layer failure. In this manner, when the UE seeks to establish a new network connection via a different base station due to detection of the failure of air interface communication, the network controller accepts the service request because the UE's context record has already been released. This speeds up establishment of a new connection for the UE and avoids unnecessary consumption of network resources.

Accordingly, disclosed herein is a method operable in a wireless communication system including a base station. The base station has a protocol stack defining a series of logical processing layers through which the base station sequentially processes data for transmission from the base station to a UE served by the base station. The series of layers includes an upper layer and a subsequent physical layer at which the base station processes the data for communication over an air interface to the UE.

In accordance with the method, the base station detects failure of air interface communication between the base station and the UE. In response to detecting the failure of the air interface communication, and without waiting to detect at the upper layer a further failure corresponding with the failure of the air interface communication, the base station transmits to a network controller a UE-context release request requesting release of bearer context that was established for the UE.

Additionally, disclosed herein is a wireless communication system including an MME and a base station. The base station has a protocol stack defining a series of logical processing layers through which the base station sequentially processes data for transmission from the base station to a UE served by the base station. The series of layers includes a PDCP layer and a subsequent physical layer at which the base station processes the data for communication over an air interface to the UE.

Moreover, the base station is configured to perform operations. The operations include detecting failure of air interface communication between the base station and the UE.

The operations also include, responsive to detecting the failure of the air interface communication, and without waiting to detect at the PDCP layer a further failure corresponding with the failure of the air interface communication, transmitting to the MME a UE-context release request requesting release of bearer context that was established for the UE.

Further, in another respect, disclosed is a non-transitory computer-readable medium having stored thereon instructions executable by a processor to cause a wireless communication system to carry out functions such as those noted above, to facilitate expedited release of a UE's context record.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIGS. 5A-4B are illustrations depicting example release of a UE's context record in response to failure of air interface communication, in accordance with an example embodiment.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
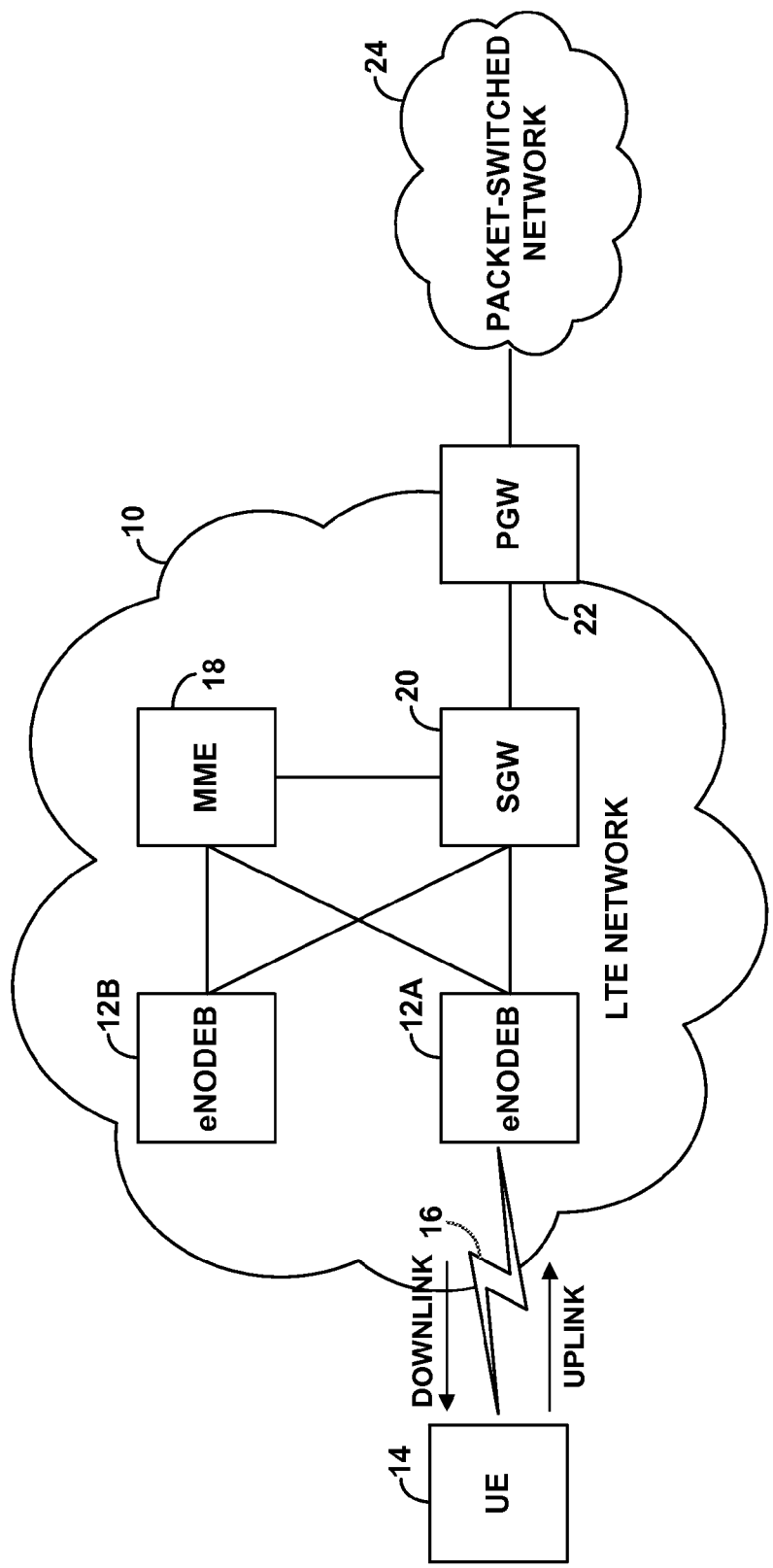
FIG. 1 is a simplified block diagram of a wireless communication system in which the present method can be implemented.

Referring to the drawings, FIG. 1 is a simplified block diagram of a wireless communication system in which the present method can be implemented. In particular, FIG. 1 depicts a representative LTE network 10, which functions primarily to serve UEs with wireless packet data communication service, including possibly voice over Internet Protocol (VoIP) service, but may also provide other functions. As shown, the LTE network 10 includes example LTE macro base stations known as eNodeBs 12A-12B. Each such eNodeB has an antenna structure and associated equipment for providing an LTE coverage area in which to serve UEs such as an example UE 14. For instance, eNodeB 12A radiates to define a wireless air interface 16 through which the eNodeB 12A may communicate with one or more served UEs, such as UE 14, via the downlink and the uplink.

A base station may operate to serve UEs on one or more carriers that may each span some frequency bandwidth. In particular, the base station may transmit bearer data and/or control signaling (e.g., to a UE) on a set of air interface resources reserved to define a downlink frequency channel. Additionally, the base station may receive bearer data and/or control signaling (e.g., from a UE) on a set of air interface resources reserved to define an uplink frequency channel. Moreover, the base station in a wireless communication system can take various forms. For instance, the base station could be a macro base station operated by a wireless carrier to provide a broad range of coverage and may thus include a tall antenna tower and a power amplifier for providing high transmission power. Alternatively, the base station could be a small cell base station ("small cell"), such as a femtocell, typically having a much smaller form factor and operating at lower transmission power for providing a smaller range of coverage.

As shown in FIG. 1, eNodeBs 12A-12B each have a communication interface with an MME 18. The MME 18 can function as a signaling controller for the LTE network 10. Further, eNodeBs 12A-12B each have a communication interface with a serving gateway (SGW) 20, which in turn has a communication interface with a packet-data network gateway (PGW) 22 that provides connectivity with a packet-switched network 24, and the MME 18 has a communication interface with the SGW 20. In particular, the eNodeBs 12A-12B are each communicatively linked with a core network, which is operated by a wireless service provider. The core network then provides connectivity with one or more MMEs, such as MME 18, as well as one or more gateways such as SGW 20 and PGW 22.

Figure 2:
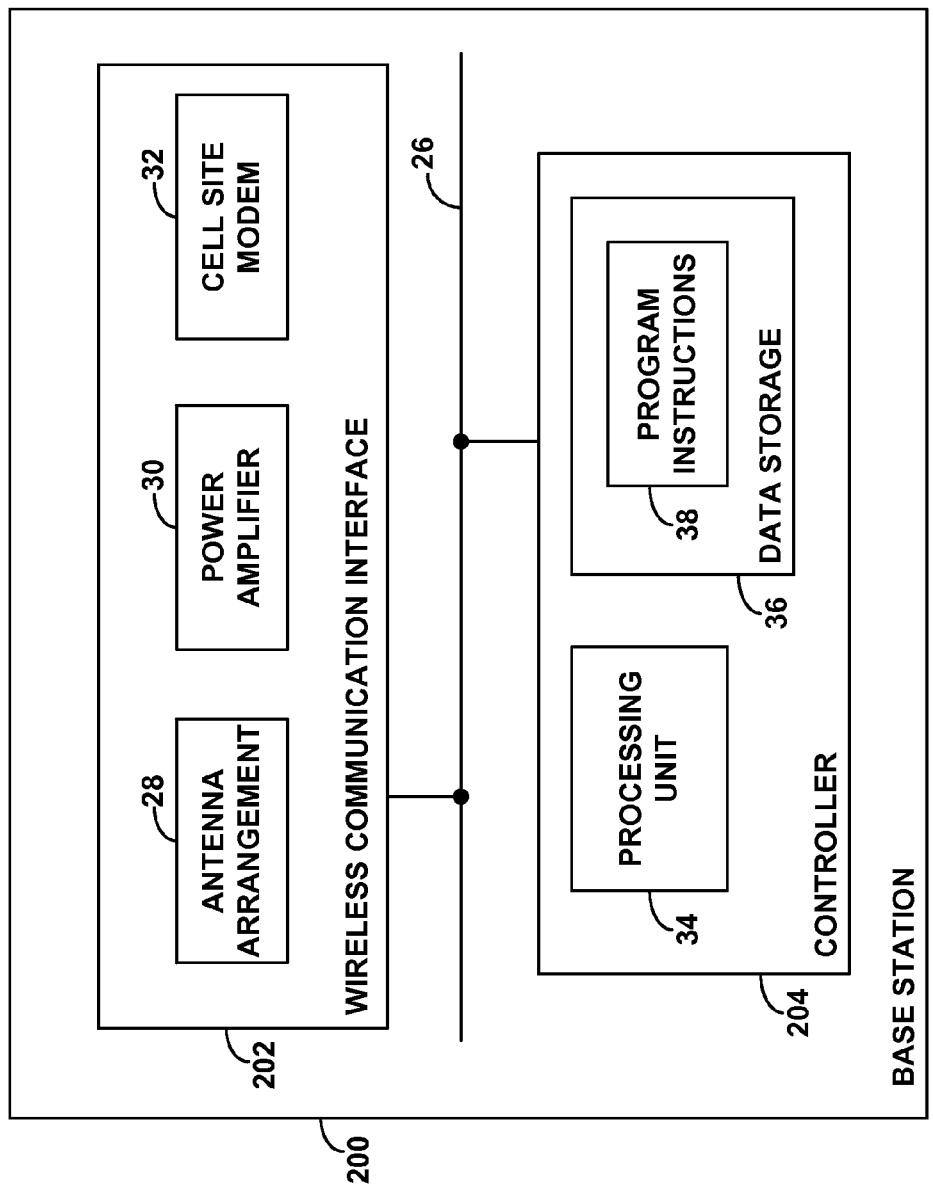
FIG. 2 is a simplified block diagram of a base station in which the present method can be implemented.

FIG. 2 is next a simplified block diagram of a representative base station 200 such as eNodeB 12A or eNodeB 12B, illustrating some of the components that can be included in such an entity. As shown in FIG. 2, the representative base station 200 may include a wireless communication interface 202 and a controller 204. As shown, these components of the base station 200 may be communicatively linked together by a system bus, network, or other connection mechanism 26. Alternatively, they may be integrated together in various ways.

As shown, wireless communication interface 202 may include an antenna arrangement 28, which may be tower mounted, and associated components such as a power amplifier 30 and a cell site modem 32 for engaging in air interface communication with UEs via the antenna arrangement 28, so as to transmit data and control information to the UEs and receive data and control information from the UEs. Additionally, controller 204 is arranged to manage or carry out various functions such as those discussed herein. In particular, the controller 204 may include processing unit 34 and data storage 36.

Processing unit 34 may then comprise one or more general purpose processors (e.g., microprocessors) and/or special-purpose processors (e.g., digital signal processors and/or application specific integrated circuits) and may be integrated in whole or in part with the wireless communication interface 202. And data storage 36 may include one or more volatile and/or non-volatile storage components, such as magnetic, optical, flash, or other types of non-transitory computer readable media, and may be integrated in whole or in part with processing unit 34. As further shown in FIG. 2, data storage 36 may hold (e.g., have encoded thereon) program instructions 38, which may be executable by processing unit 34 to carry out various controller functions. As such, the processing unit 34 programmed with instructions 38 may define part or all of controller 204 for controlling operation of the base station 200.

As noted above, in accordance with LTE, when the UE 14 enters into coverage of the eNodeB 12A, the UE 14 and LTE network 10 may engage in an initial attach process. Through the initial attach process and/or subsequently, the LTE network 10 may establish for the UE 14 one or more bearers extending between the UE 14 and the PGW 22, for carrying data communications between the UE 14 and the packet-switched network 24. This establishment of bearers may be initiated by the UE 14 or may be initiated by the LTE network 10. An initial setup of one or more bearers for the UE 14 may involve establishing for each bearer a respective virtual tunnel that includes a radio-link tunnel extending between the UE 14 and the eNodeB 12A and a backhaul tunnel extending between the eNodeB 12A and the PGW 22 via the SGW 20.

By way of example, when the UE 14 first attaches, the MME 18 may engage in signaling with a home subscriber server (HSS) (not shown) to authenticate the UE 14 for service in the LTE network 10. In that process, the MME 18 may receive from the HSS a service profile record specifying various service authorizations for the UE 14. Moreover, as part of the attach process, the MME 18 may receive UE capability information from the UE 14 and/or from the HSS. The MME 18 may then generate and store a UE context record for the UE 14. This context record may specify the service profile, capabilities information, and an identifier (e.g., a Globally Unique Temporary ID (GUTI)) of the UE 14, for reference by the MME 18 while serving the UE 14.

Additionally, the MME 18 may engage in signaling with the gateway system (e.g., SGW 20 and/or PGW 22) and with the eNodeB 12A in order to set up and manage one or more bearer connections extending between the UE 14 and the PGW 22 and thus between the UE 14 and the packet-switched network 24. In particular, the MME 18 may generate and transmit to the SGW 20 a create-session request identifying the serving eNodeB 12A and triggering setup of a tunnel between the SGW 20 and PGW 22 and perhaps assignment of an IP address for the UE 14. Upon receipt of a create-session response from the SGW 20, the MME 18 may then further generate and transmit to the eNodeB 12A an attach-accept message identifying the SGW 20 and triggering setup of a tunnel between the eNodeB 12A and the SGW 20 as well as assignment of a corresponding radio bearer identity defining a tunnel between the UE 14 and the eNodeB 12A.

More specifically, the attach process may also involve establishing for the UE 14 a logical "Radio Resource Control" (RRC) connection encompassing the one or more radio-link portions. Thus, in the event such an RRC connection is not already established, UE 14 sends an RRC Connection Request message to eNodeB 12A. The RRC Connection Request message may include an identifier of UE 14 (e.g., a GUTI). In response, eNodeB 12A may send to UE 14 an RRC Connection Setup message to indicate that the network recognizes UE 14 and that the network is able to provide network services. UE 14 may then send to eNodeB 12A an RRC Connection Setup Complete message to acknowledge establishment of the RRC connection.

At a later point in time, in some scenarios, the UE 14 may transition from an RRC "connected" mode to an RRC "idle" mode in which the UE 14 does not have a radio-link layer connection. In such scenarios, the UE 14 can trigger reassignment of an RRC connection and thereby transition back into the RRC connected mode.

Given this arrangement, the MME 18 may manage establishment of a bearer defining a series of tunnels extending (i) between the UE 14 and the eNodeB 12A, (ii) between the eNodeB 12A and the SGW 20, and (iii) between the SGW 20 and the PGW 22. For each such bearer connection, the MME 18 may record in the UE's context record an evolved packet system (EPS) bearer identity for the UE 14. In this manner, the context record may define a bearer context representing the established bearer connections for the UE 14. With each such bearer established, the UE 14 may then engage in packet-switched communication on the network 24, to communicate with a remote packet network node for example. Other examples may also be possible.

Figure 3A:
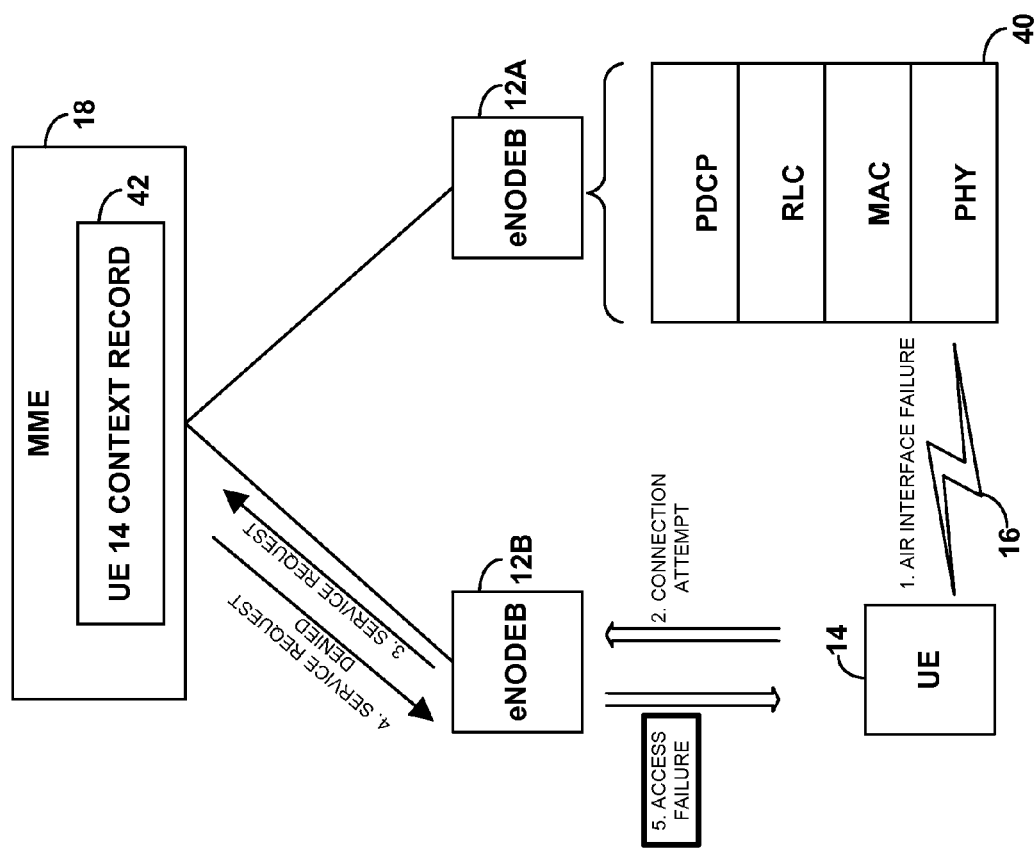
FIGS. 3A-3B are illustrations depicting example release of a UE's context record in response to a PDCP layer failure.

As further noted above, an air interface protocol may include a user plane protocol stack and a control plane protocol stack to organize data carried between a base station and UEs. FIG. 3A shows eNodeB 12A as having such an example protocol stack 40. As shown, the protocol stack 40 defines a series of logical processing layers such as a physical (PHY) layer, a MAC layer, an RLC layer, and a PDCP layer. The eNodeB 12A may sequentially process data through the upper layers (e.g., PDCP, MAC, and RLC) down to the physical layer at which the eNodeB 12A processes the data for communication over the air interface 16 to the UE 14.

In an example arrangement, lower layers provide services to the layers immediately above them, such as by handling and managing data received from the layer above. In particular, a data packet received by a particular layer from the above layer is referred to as Service Data Unit (SDU) while the data packet output of a particular layer is referred to as a Protocol Data Unit (PDU). In this arrangement, at any particular layer N, a PDU is a data packet that has implemented the protocol at that layer N. When this "layer N PDU" (e.g., PDCP PDU) is passed down to layer N−1 (e.g., RLC), the layer N PDU becomes the data that the layer N−1 protocol operates to service. Thus, the layer N PDU is called the layer N−1 SDU (e.g., RLC SDU).

Subsequently, the layer N−1 then operates to transform this layer N−1 SDU into a PDU format that includes implementation of the protocol at the layer N−1. For instance, this may involve preceding the layer N−1 SDU with headers and/or appending footers as defined by the protocol of the layer N−1. The process may sequentially continue in this manner all the way down to the physical layer at which an SDU is received. This SDU may consist of data that is encapsulated with headers and/or footers from each the above layers. This received data is then processed at the physical layer for communication over the air interface 16 to the UE 14.

By way of a specific example, the PDCP layer may receive a PDU from an above layer (e.g., an IP layer). This PDU becomes the data that the PDCP layer operates to service. Thus, the IP layer PDU is called the PDCP layer SDU. Once received, the PDCP layer may perform header compression to this PDCP SDU by, for example, reducing size of an IP header (e.g., from 20 bytes to 4 bytes). This may provide for savings in the size of the header that would otherwise have to be transmitted over the air interface. Once the PDCP layer services the PDCP SDU, the PDCP SDU becomes a PDCP PDU. The PDCP layer then submits this PDCP PDU to the RLC layer, where the PDCP PDU becomes an RLC SDU.

The RLC layer then services this RLC SDU, such as by providing for RLC segmentation, among other possible operations. Once the RLC layer services the RLC SDU, the RLC SDU becomes an RLC PDU. The RLC layer then submits this RLC PDU to the MAC layer, where the RLC PDU becomes a MAC SDU. The MAC layer then services this MAC SDU, such as by adding a MAC address, among other possible operations. Once the MAC layer services the MAC SDU, the MAC SDU becomes a MAC PDU. The MAC layer then submits this MAC PDU to the physical layer for processing the received data for communication over the air interface 16 to the UE 14. Such processing at the physical layer may involve signal modulation, among other possible operations.

Successful transmission of such particular data from the eNodeB 12A to the UE 14 results in the UE 14 processing the particular data and responsively sending an acknowledgement to the eNodeB 12A representing successful transmission of the particular data. As noted above, eNodeB 12A can detect such successful physical layer transmission of the particular data from the eNodeB 12A to the UE 14 by receiving this acknowledgement from the UE 14. A failure to receive this acknowledgement, however, may result in detection, by the eNodeB 12A, of a physical layer failure of air interface communication between eNodeB 12A and the UE 14, as depicted by step 1 of FIG. 3A.

The eNodeB 12A can detect such failure of air interface communication in one of various ways. In one example, the eNodeB 12A may detect a threshold number of instances (e.g., four attempts to transmit the particular data) of the eNodeB 12A failing to receive the acknowledgement from the UE 14. In another example, the eNodeB 12A may include a timer that initiates upon transmission of the particular data to the UE 14. In this example, the eNodeB 12A may detect a threshold duration of the eNodeB 12A failing to receive the acknowledgment from the UE 14. For instance, the eNodeB 12A may detect the failure if no acknowledgement is received when the timer indicates that 20 seconds have passed since transmission of the particular data. Other examples may also be possible.

As noted above, receiving by the eNodeB 12A the acknowledgment from the UE 14 represents successful transmission of the particular data from the eNodeB 12A to the UE 14, and causes a subsequent series of acknowledgements to pass up the protocol stack. For instance, the physical layer may send an acknowledgement to the MAC layer and then the MAC layer may responsively send an acknowledgement to the RLC layer and so on. Given this arrangement, receiving an acknowledgement by a particular layer from the layer below may serve as an indication to the particular layer of successful transmission of the particular data over the air interface. This may responsively enable the particular layer to transmit the next data packet (e.g., next PDU) to the layer below.

On the other hand, detecting failure of air interface communication by the eNodeB 12A may cause the eNodeB 12A to trigger re-transmissions of the particular data at the upper layers. By way of example, detection of physical layer failure of air interface communication may cause re-transmission attempts of the data at the MAC layer. A MAC layer failure may then cause re-transmission attempts of the data at the RLC layer, and a subsequent RLC layer failure may cause re-transmission attempts of the data at the PDCP layer and so on. Each such re-transmission attempt at a particular upper layer may involve the particular upper layer again servicing the corresponding SDU and then submitting the resulting PDU for subsequent processing at the layers below. Moreover, servicing the corresponding SDU by the particular upper layer may be done in the same manner (e.g., same extent of IP header compression at the PDCP layer) during each re-transmission attempt, or may be done in a different manner (e.g., different extents of IP header compression at the PDCP layer) during each re-transmission attempt so as to increase the likelihood of a successful transmission over the air interface 16, among other possibilities.

Nonetheless, the eNodeB 12A may detect the above mentioned upper layer failures in one of various ways. For instance, the eNodeB 12A may detect such failure when a particular layer fails to receive from a lower layer the acknowledgement representing successful transmission of the particular data from the eNodeB 12A to the UE 14. In one specific example, the eNodeB 12A may detect a threshold number of instances (e.g., three attempts to transmit the particular data) of the particular layer failing to receive an acknowledgement, from a lower layer, representing successful transmission of the particular data from the eNodeB 12A to the UE 14.

In another specific example, the particular layer may include a corresponding timer that initiates upon transmission of a corresponding data packet from the particular layer onto the next lower layer. In this example, the eNodeB 12A may detect threshold duration of the particular layer failing to receive the acknowledgment from the lower layer. For instance, the eNodeB 12A may detect a threshold delay of outputting the data from the PDCP layer for further processing by the protocol stack 40, where the threshold delay may result from failure to receive the acknowledgement. Other examples may also be possible.

In a further aspect, the UE 14 can also detect the failure of air interface communication and may do so in one of various ways. For instance, as noted above, the UE 14 may detect the failure by determining a lack of response, from the eNodeB 12A, to a communication from the UE 14 to eNodeB 12A. In some cases, after detecting by the UE 14 the failure of air interface communication, the UE 14 may attempt to establish a connection with the wireless communication system via a different base station such as via eNodeB 12B (e.g., as depicted by step 2 of FIG. 3A) if the UE 14 is within coverage of the eNodeB 12B.

By way of example, this connection attempt may involve the UE 14 transmitting to the eNodeB 12B an RRC connection request message. As depicted by step 3 of FIG. 3A, this may then trigger transmission of a service request message, from the eNodeB 12B to the MME 18, requesting establishment of one or more new bearers for the UE 14. In particular, such new bearers may extend, via the eNodeB 12B, between the UE 14 and the PGW 22, for carrying data communications between the UE 14 and the packet-switched network 24.

As shown at step 4, however, the MME 18 responsively sends to the eNodeB 12B a message informing the eNodeB 12B that the MME 18 has denied the service request. The MME 18 may deny the service request because the MME 18 still has stored thereon a context record 42 for the UE 14. In particular, this context record 42 includes data specifying service status of the UE 14 such as of the particular bearer established for the UE 14 via the eNodeB 12A for example. As a result, the MME 18 may interpret presence of the context record 42 as the UE 14 still having the bearer connection established for the UE 14 via the eNodeB 12A, and may thus deny the service request that seeks establishment for the UE 14 of a bearer via eNodeB 12B. Further, in response to receiving this denial from the MME 18, the eNodeB 12B may then send an access failure message to UE 14, at step 5, such that the UE 14 perceives failure of the connection attempt and may responsively re-attempt to gain access to the LTE network 10 (e.g., via eNodeB 12B or via another base station).

Figure 3B:
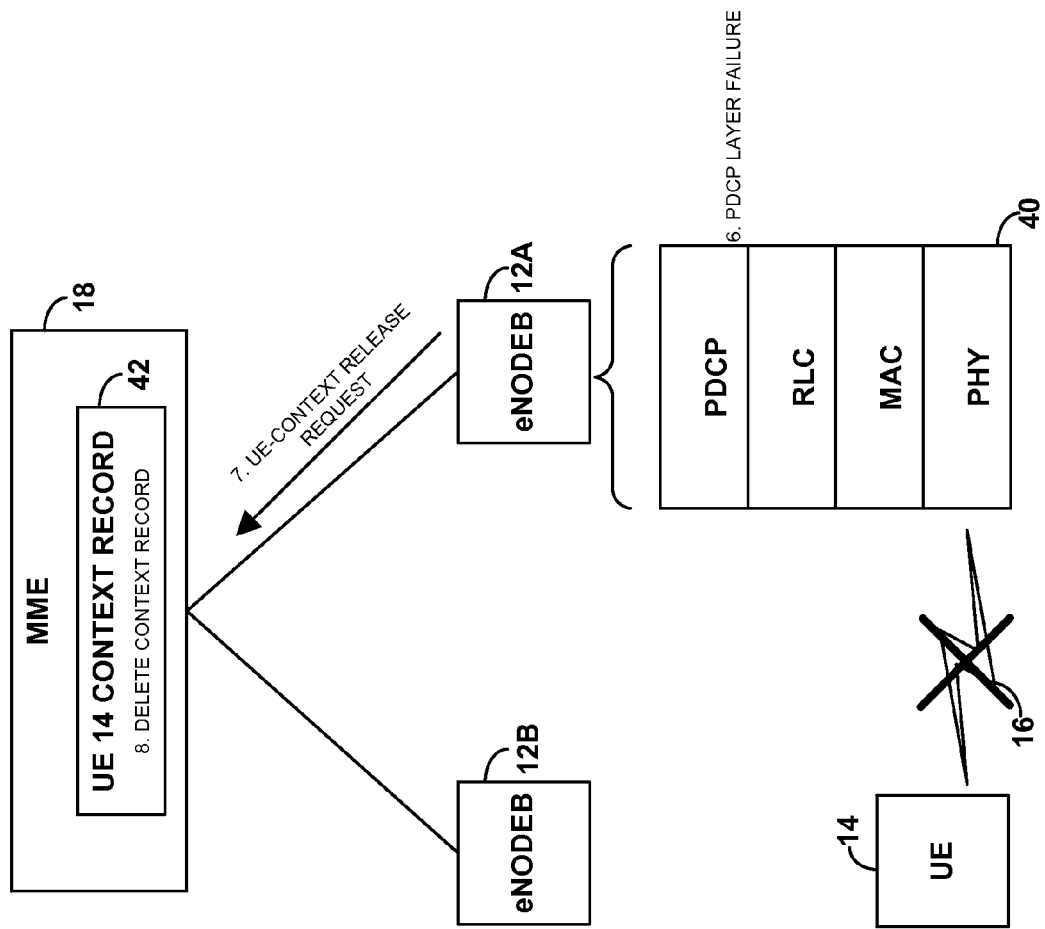

As noted above, the eNodeB 12A generally waits to detect failure at an upper layer, such as the PDCP layer, before sending a UE-context release request to the MME 18. For instance, FIG. 3B illustrates a PDCP layer failure, at step 6, which, in this example, takes place after the MME 18 has already denied the initial service request. In response to detecting the PDCP layer failure, the eNodeB 12A sends the UE-context release request to the MME 18 at step 7. Once the MME 18 receives the UE-context release request, the MME 18 then operates (e.g. at step 8) to trigger release of the bearer connection established for the UE 14 via eNodeB 12A and to delete the context record 42 that had identified the bearer and facilitated exchange of bearer traffic for the UE 14 via eNodeB 12A.

Accordingly, the MME 18 may interpret such release of the context record 42 as release of the bearer connection established for the UE 14 via the eNodeB 12A and may thus be set to accept a subsequent service request. Although the MME 18 is set to accept a subsequent service request after release of the context record, the wait by the eNodeB 12A to detect failure at the PDCP layer, before sending the UE-context release request, causes the UE 14 to unnecessarily perceive, at step 5, an access failure via eNodeB 12B and thus causes the UE 14 to again attempt to gain access to the LTE network 10 (e.g., via eNodeB 12B). Overall, this results in unnecessary consumption of network resources and a delay in establishing a new connection for the UE 14 via eNodeB 12B. Thus, disclosed below are methods and systems that avoid problems resulting from the wait to detect failure at an upper layer before requesting release of a UE's context record.

Figure 4:
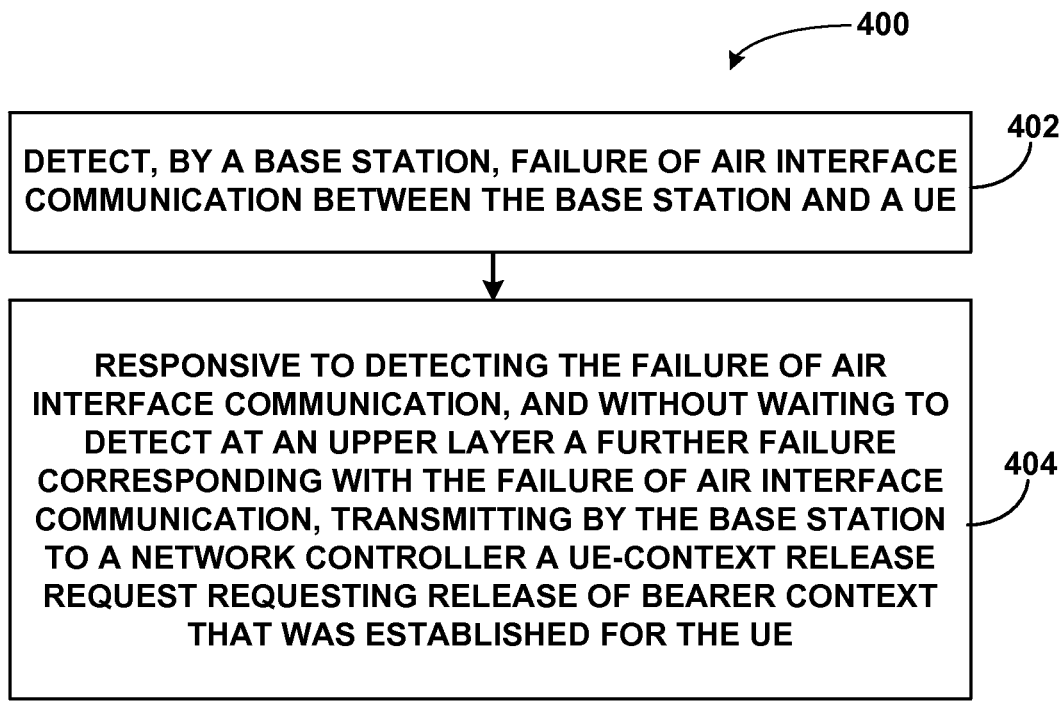
FIG. 4 is a flowchart illustrating a method for facilitating expedited release of a UE's context record, in accordance with an example embodiment.

FIG. 4 is a flowchart illustrating a method 400, according to an example embodiment. Illustrative methods, such as method 400, may be carried out in whole or in part by component(s) and/or arrangement(s) in a wireless communication system, such as by the one or more of the components of the representative LTE network 10 shown in FIG. 1 and/or with one or more of the components of the base station 200 shown in FIG. 2. However, it should be understood that example methods, such as method 400, may be carried out by other entities or combinations of entities as well as in other arrangements, without departing from the scope of the disclosure.

In particular, method 400 may be operable in a wireless communication system that includes a base station that radiates to provide wireless coverage in which to serve UEs. The base station has a protocol stack (e.g., protocol stack 40) defining a series of logical processing layers through which the base station sequentially processes data for transmission from the base station to a UE served by the base station, the series of layers including an upper layer (e.g., PDCP layer) and a subsequent physical layer at which the base station processes the data for communication over an air interface (e.g., air interface 16) to the UE (e.g., UE 14).

As shown by block 402 in FIG. 4, method 400 involves detecting, by the base station, failure of air interface communication between the base station and the UE. At block 404, method 400 then involves, responsive to detecting the failure of the air interface communication, and without waiting to detect at the upper layer a further failure corresponding with the failure of the air interface communication, transmitting by the base station to a network controller a UE-context release request requesting release of bearer context that was established for the UE.

Figure 5A:
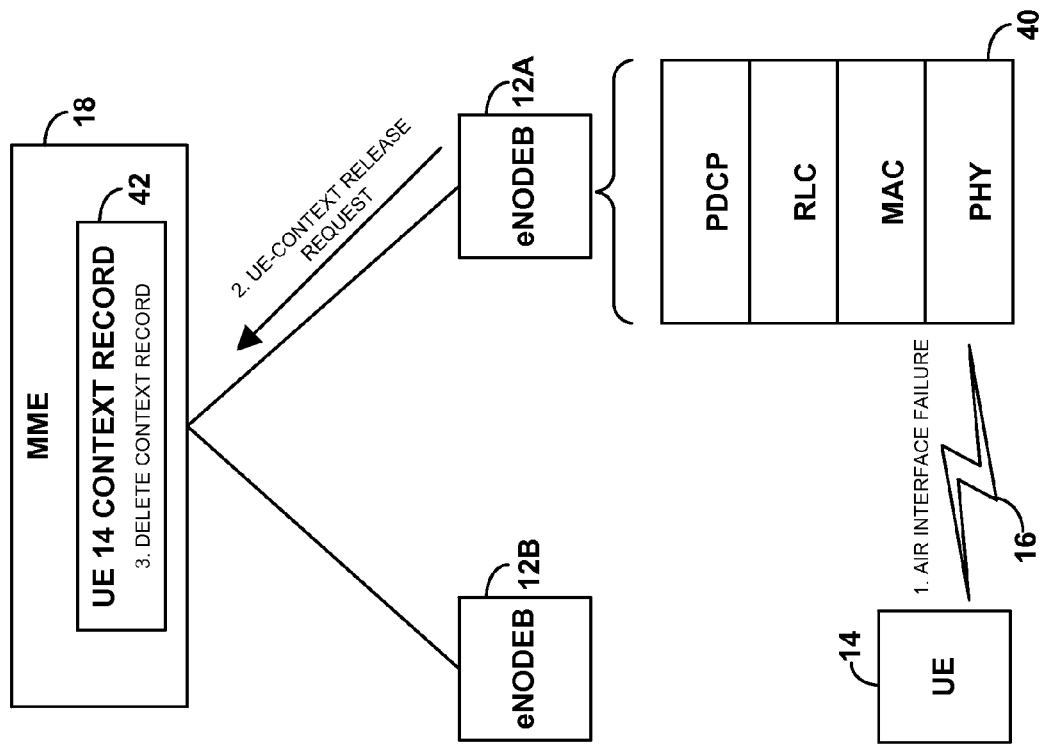

FIG. 5A depicts a failure of air interface communication at step 1. As noted above, the eNodeB 12A can detect such failure of air interface communication in one of various ways. In one example, the eNodeB 12A may detect a threshold number of instances of the eNodeB 12A failing to receive an acknowledgement, from the UE 14, representing successful transmission of the particular data from the eNodeB 12A to the UE 14. In another example, the eNodeB 12A may include a timer that initiates upon transmission of the particular data to the UE 14. In this example, the eNodeB 12A may detect a threshold duration of the eNodeB 12A failing to receive the acknowledgment from the UE 14.

In response detecting the failure of air interface communication, the eNodeB 12A sends a UE-context release request to the MME 18 as depicted by step 2 in FIG. 5A. Once the MME 18 receives the UE-context release request, the MME 18 operates (e.g. at step 3) to trigger release of the bearer connection established for the UE 14 via eNodeB 12A and to delete the context record of the UE 14 that had identified the bearer and facilitated exchange of bearer traffic for the UE 14 via eNodeB 12A. This process essentially results in release of the bearer context that that was established for the UE 14 as well as in implicitly detaching the UE 14 from the LTE network 10, by clearing the resources in the LTE network that had been allocated to serve the UE 14 via eNodeB 12A. Moreover, such release of the bearer context takes place without waiting for an upper layer failure as described above. Rather, release of the bearer context takes place in response to a physical layer failure of air interface communication.

Figure 5B:
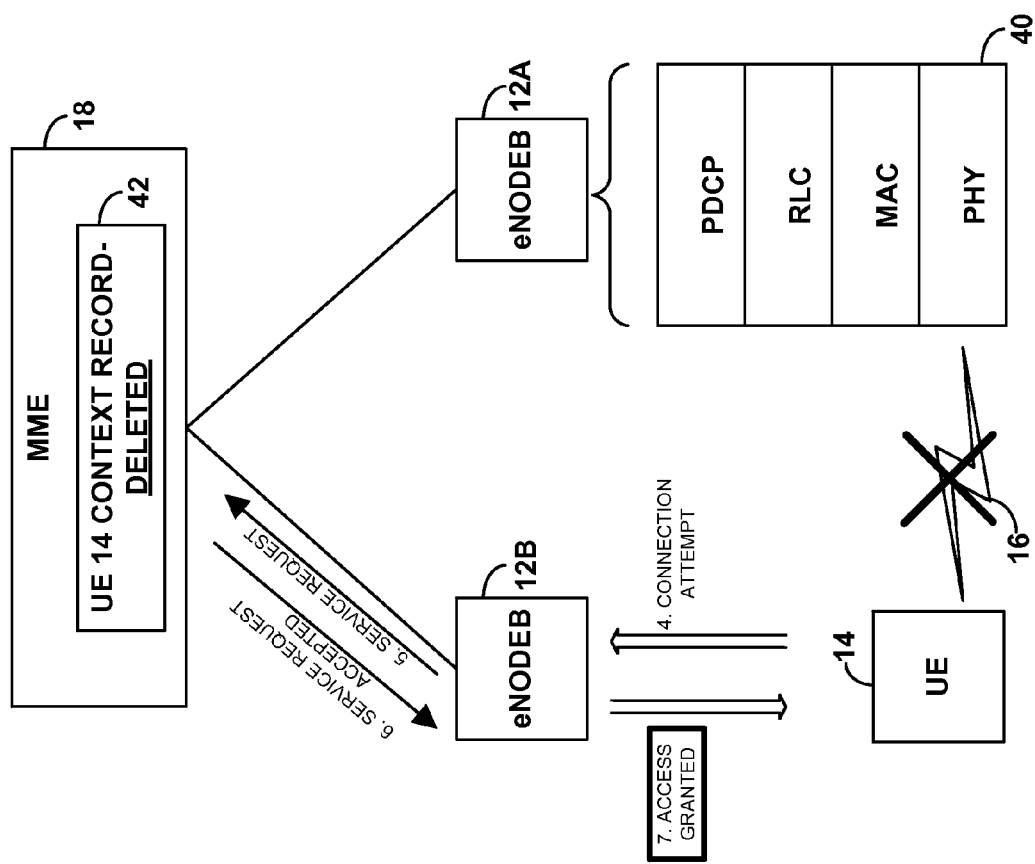

As discussed above, the UE 14 can also detect the failure of air interface communication. After detecting by the UE 14 the failure of air interface communication, the UE 14 may attempt to establish a connection with the LTE network via different base station such as via eNodeB 12B, as depicted by step 4 of FIG. 5B. The UE 14 may do so while the UE 14 is within coverage of the eNodeB 12B. In particular, the UE 14 may transmit an RRC connection request message to the eNodeB 12B. This may then trigger transmission of a service request message from the eNodeB 12B to the MME 18 as depicted by step 5. This service request message requests establishment of one or more new bearers for the UE 14 via eNodeB 12B.

As shown, the MME 18 sends at step 6 a message, to the eNodeB 12B, informing the eNodeB 12B that the MME 18 has accepted the service request. The eNodeB 12B may then responsively send an access granted message to the UE 14, as depicted by step 7 of FIG. 5B. For instance, eNodeB 12B may send to UE 14 an RRC Connection Setup message to indicate that the network recognizes UE 14 and that the network is able to provide network services. The UE 14 may then send to eNodeB 12B an RRC Connection Setup Complete message to acknowledge establishment of the new RRC connection.

Given this implementation, the MME 18 accepts the service request because the MME 18 no longer has stored thereon a context record 42 for the UE 14 (e.g., the context record 42 has been deleted). In particular, the MME 18 may interpret release of the context record 42, before receiving the service request, as release of the bearer connection established for the UE 14 via the eNodeB 12A. Thus, release of the context record 42 before receiving the service request allows the MME 18 to recognize the service request as an attempt by UE 14 to establish a new connection with the LTE network 10, via eNodeB 12B, rather than interpreting the service request as an erroneous duplicate due to an existing context record.

Exemplary embodiments have been described above. Those skilled in the art will understand, however, that changes and modifications may be made to these embodiments without departing from the true scope and spirit of the invention.

We claim:

1. A method operable in a wireless communication system including a base station, wherein the base station has a protocol stack defining a series of logical processing layers through which the base station sequentially processes data for transmission from the base station to a user equipment device (UE) served by the base station, the series of layers including an upper layer and a subsequent physical layer at which the base station processes the data for communication over an air interface to the UE, the method comprising:
   detecting, by the base station, a physical layer failure of air interface communication between the base station and the UE; and
   responsive to detecting the physical layer failure of the air interface communication and before occurrence at the upper layer of any further failure associated with the physical layer failure, transmitting by the base station to a network controller a UE-context release request requesting release of bearer context that was established for the UE.

2. The method of claim 1, wherein detecting the physical layer failure comprises detecting a threshold number of instances of the base station failing to receive from the UE an acknowledgement of data transmission over the air interface from the base station.

3. The method of claim 1, wherein detecting the physical layer failure comprises detecting a threshold duration of the base station failing to receive from the UE an acknowledgement of data transmission over the air interface from the base station.

4. The method of claim 1, wherein transmitting by the base station to a network controller a UE-context release request causes the network controller to release the bearer context that was established for the UE.

5. The method of claim 4, further comprising, after releasing the bearer context that was established for the UE, the network controller accepting a service request from a different base station to serve the UE.

6. The method of claim 5, wherein the UE seeks to receive service via the different base station after a determination, by the UE, of the physical layer failure of air interface communication between the base station and the UE.

7. The method of claim 1, wherein the network controller comprises a mobility management entity (MME).

8. The method of claim 1, wherein the upper layer comprises a packet data convergence protocol (PDCP) layer.

9. The method of claim 8, wherein the physical layer failure of air interface communication comprises failure of communication of particular data from the base station to the UE over the air interface, and wherein the further failure comprises a threshold delay of outputting the particular data from the PDCP layer for further processing by the protocol stack.

10. A non-transitory computer readable medium having stored thereon instructions executable by a processor to cause a wireless communication system to perform operations, the wireless communication system including a base station, wherein the base station has a protocol stack defining a series of logical processing layers through which the base station sequentially processes data for transmission from the base station to a user equipment device (UE) served by the base station, the series of layers including an upper layer and a subsequent physical layer at which the base station processes the data for communication over an air interface to the UE, the operations comprising:
   detecting a physical layer failure of air interface communication between the base station and the UE; and
   responsive to detecting the physical layer failure of the air interface communication and before occurrence at the upper layer of any further failure associated with the physical layer failure, transmitting to a network controller a UE-context release request requesting release of bearer context that was established for the UE.

11. The non-transitory computer readable medium of claim 10, wherein detecting the physical layer failure comprises detecting a threshold number of instances of the base station failing to receive from the UE an acknowledgement of data transmission over the air interface from the base station.

12. The non-transitory computer readable medium of claim 10, wherein detecting the physical layer failure comprises detecting a threshold duration of the base station failing to receive from the UE an acknowledgement of data transmission over the air interface from the base station.

13. The non-transitory computer readable medium of claim 10, wherein transmitting by the base station to a network controller a UE-context release request causes the network controller to release the bearer context that was established for the UE.

14. The non-transitory computer readable medium of claim 13, the operations further comprising, after releasing the bearer context that was established for the UE, the network controller accepting a service request from a different base station to serve the UE.

15. The non-transitory computer readable medium of claim 14, wherein the UE seeks to receive service via the different base station after a determination, by the UE, of the physical layer failure of air interface communication between the base station and the UE.

16. The non-transitory computer readable medium of claim 10, wherein the physical layer failure of air interface communication comprises failure of communication of particular data from the base station to the UE over the air interface.

17. The non-transitory computer readable medium of claim 16, wherein the upper layer comprises a packet data convergence protocol (PDCP) layer, and wherein the further failure comprises a threshold delay of outputting the particular data from the PDCP layer for further processing by the protocol stack.

18. A wireless communication system comprising:
   a mobility management entity (MME); and
   a base station that has a protocol stack defining a series of logical processing layers through which the base station sequentially processes data for transmission from the base station to a user equipment device (UE) served by the base station, the series of layers including a packet data convergence protocol (PDCP) layer and a subsequent physical layer at which the base station processes the data for communication over an air interface to the UE, wherein the base station is configured to perform operations comprising:
      detecting a physical layer failure of air interface communication between the base station and the UE; and
      responsive to detecting the physical layer failure of the air interface communication and before occurrence at the upper layer of any further failure associated with the physical layer failure, transmitting to the MME a UE-context release request requesting release of bearer context that was established for the UE.

19. The wireless communication system of claim 18, further comprising a different base station, and wherein the network controller is configured to perform operations comprising, after releasing the bearer context that was established for the UE, accepting a service request from the different base station to serve the UE.

20. The wireless communication system of claim 18, wherein the physical layer failure of air interface communication comprises failure of communication of particular data from the base station to the UE over the air interface, and wherein the further failure comprises a threshold delay of outputting the particular data from the PDCP layer for further processing by the protocol stack.

* * * * *